Figure 4:
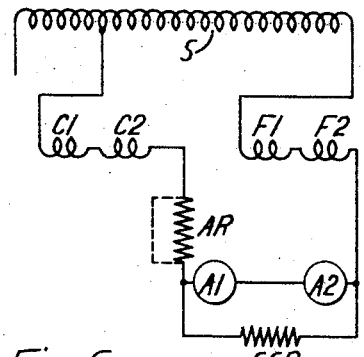

H. T. MORRIS.
SYSTEM OF CONTROL.
APPLICATION FILED SEPT. 25, 1914.
1,305,149.
Patented May 27, 1919.
4 SHEETS—SHEET 1.
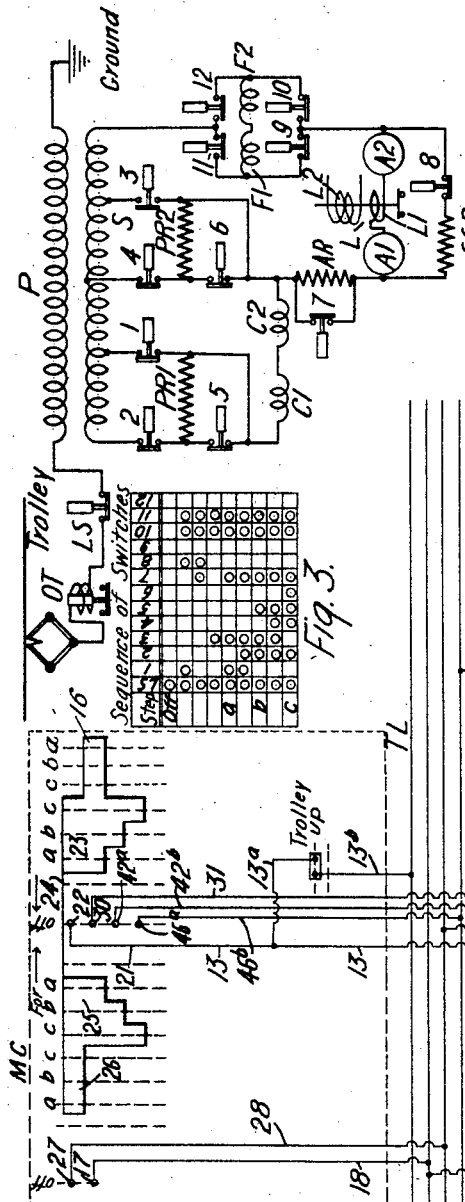
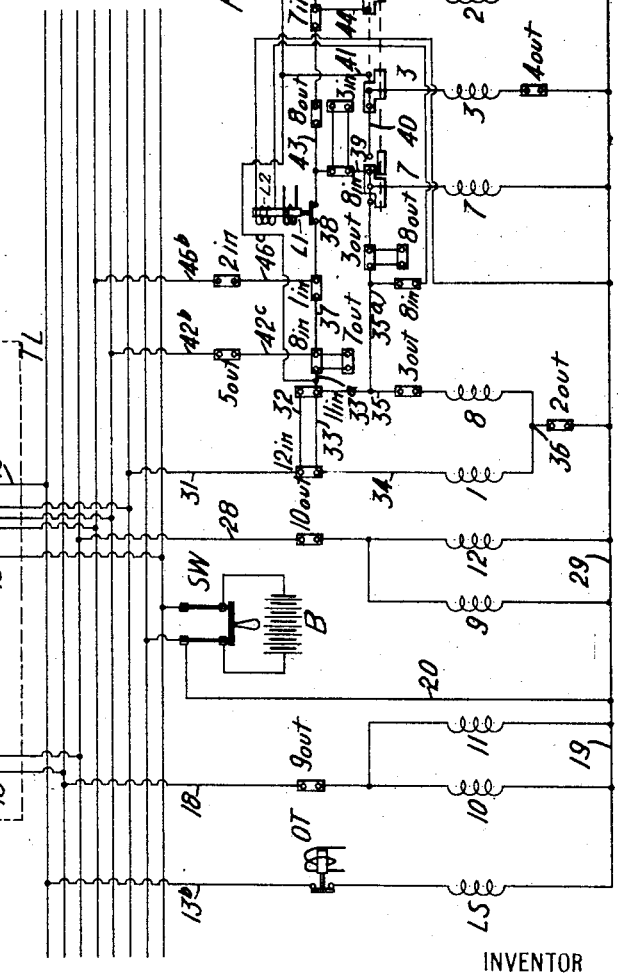
WITNESSES:
Fred. A. Lind
W. R. Coley
INVENTOR
Hurd T. Morris
BY
Wesley G. Carr
ATTORNEY

H. T. MORRIS.
SYSTEM OF CONTROL.
APPLICATION FILED SEPT. 25, 1914.

1,305,149.

Patented May 27, 1919.
4 SHEETS—SHEET 2.

WITNESSES:
Fred A. Lind
W. R. Coley

INVENTOR
Hurd T. Morris
BY
Wesley G. Carr
ATTORNEY

H. T. MORRIS.
SYSTEM OF CONTROL.
APPLICATION FILED SEPT. 25, 1914.
1,305,149.
Patented May 27, 1919.
4 SHEETS—SHEET 3.
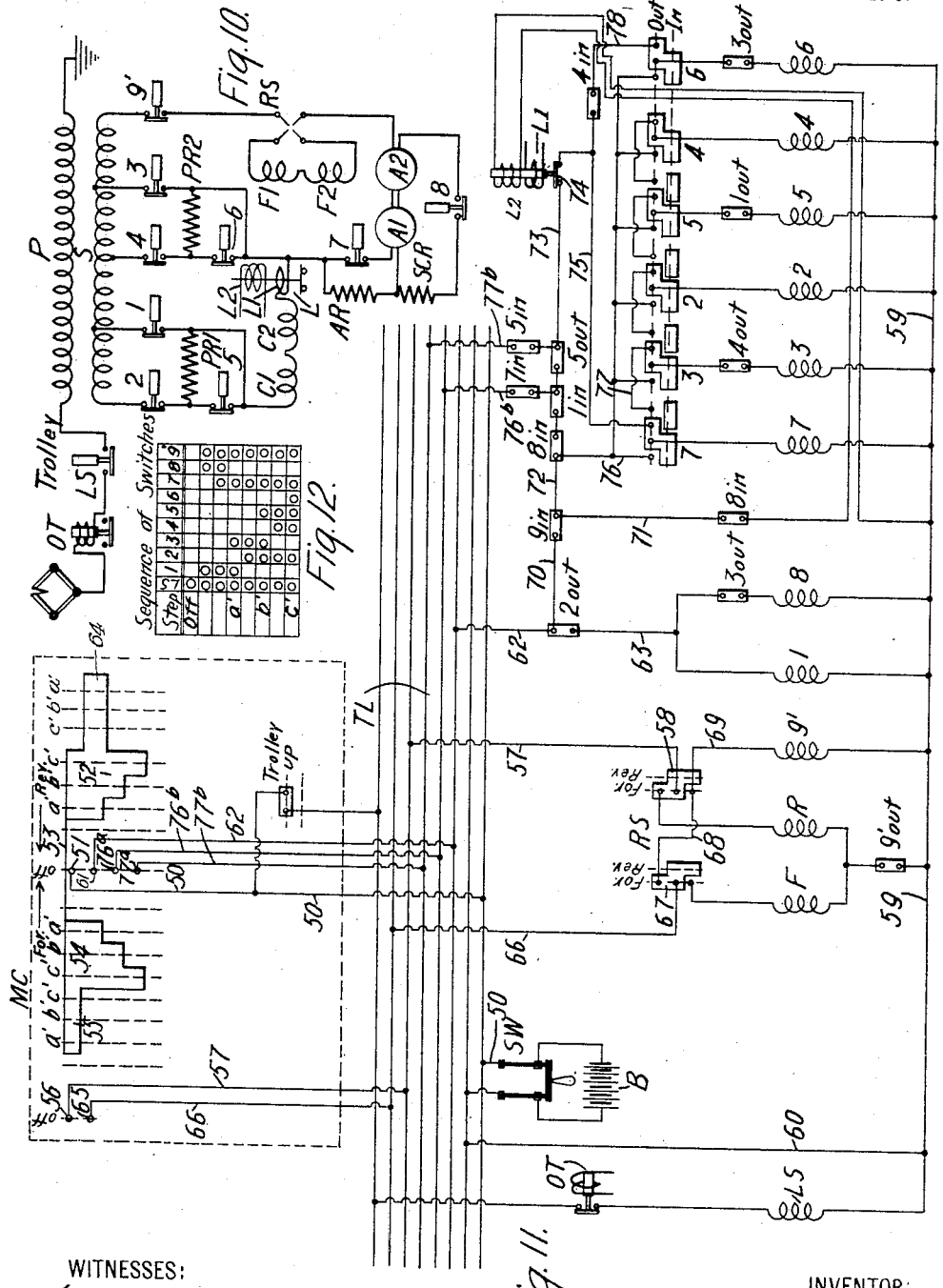
WITNESSES:
Fred. A. Lind
W. R. Coley
INVENTOR
Hurd T. Morris
BY
Wesley G. Carr
ATTORNEY H. T. MORRIS.
SYSTEM OF CONTROL.
APPLICATION FILED SEPT. 25, 1914.
1,305,149.
Patented May 27, 1919.
4 SHEETS—SHEET 4.
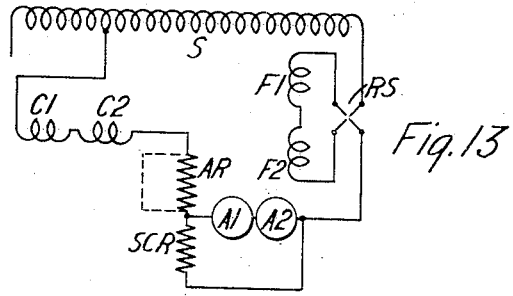
Fig. 13.
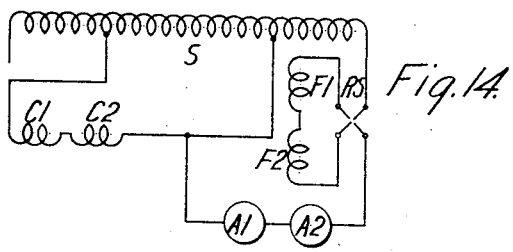
Fig. 14.
Fig. 15.
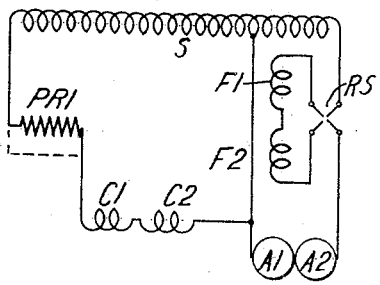
Fig. 16.
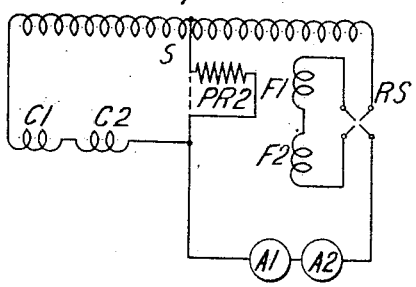
WITNESSES:
Fred A. Lind
W. A. Coley
INVENTOR
Hurd T. Morris
BY
Wesley G. Carr
ATTORNEY

UNITED STATES PATENT OFFICE.

HURD T. MORRIS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,305,149. Specification of Letters Patent. Patented May 27, 1919.

Application filed September 25, 1914. Serial No. 863,511.

*To all whom it may concern:*

Be it known that I, HURD T. MORRIS, a citizen of the United States, and a resident of Wilkinsburg, in the county of Allegheny and State of Pennsylvania, have invented a new and useful Improvement in Systems of Control, of which the following is a specification.

My invention relates to systems of control, and it has special reference to the control of alternating-current motors of the commutator type, such as are adapted to propel electric railway vehicles and the like.

The object of my invention is to provide an automatic system of the above-indicated character which shall be simple in arrangement and effective and reliable in operation and which shall embody certain novel control features.

According to my present invention, I provide a fully automatic control system for accelerating commutator-type alternating-current motors by initial connection thereof as repulsion motors with a resistor in circuit and embodying a limit switch for thereafter successively effecting the exclusion of the resistor, the change to a "doubly-fed" connection with the resistor again in circuit, the second exclusion of the resistor, and the connection of additional portions of the customarily employed transformer winding to increase the armature voltage,-first inductively and then conductively, as the motor current successively decreases to a predetermined value after each increase of the current that is effected by the operation of the limit switch, as hereinafter fully described.

I provided also a limit switch, for the usual purpose, and having a plurality of co-operating actuating coils respectively connected in the motor circuit throughout operation and to an auxiliary source of energy during the period of repulsion-motor operation only. Thus, the propelling motors are relatively slowly started, and accelerated to the point of "doubly-fed" connection, which has been found to be of advantage when the acceleration proceeds somewhat more rapidly.

In the accompanying drawing, Figure 1 is a diagrammatic view of the main circuits of a system of control embodying my invention; Fig. 2 is a diagrammatic view of the auxiliary control circuits for manipulating the motor-controlling switches shown in Fig. 1 in accordance with the sequence chart of well known form that is shown in Fig. 3; Figs. 4 to 9 are simplified diagrammatic views serving to illustrate various main-circuit connections that are employed in the operation of my invention; Figs. 10, 11 and 12 are views of a modified form of control system which correspond, respectively, to Figs. 1, 2 and 3; and Figs. 13 to 16, inclusive, are diagrammatic views similar to the views of Figs. 4 to 9, inclusive, of certain circuit connections that are employed in the system illustrated in Fig. 10.

Referring to Fig. 1 of the drawing, the system here shown comprises a suitable supply circuit including conductors marked respectively "Trolley" and "Ground"; a transformer of any suitable type, the primary winding P of which is connected across the supply circuit through a suitable electromagnetically operated switch LS, and the secondary winding S of which is adapted to be connected to the several propelling motors, which are respectively provided with armatures A1 and A2, main or exciting field windings F1 and F2, and auxiliary or compensating field windings C1 and C2; a plurality of motor-controlling switches 1 to 12, inclusive, preferably of a familiar electromagnetically actuated type; an accelerating resistor AR that is disposed in circuit with the propelling motors, under predetermined conditions; a short-circuiting resistor SCR which is adapted to be connected across the armatures A1 and A2, under starting conditions; a plurality of preventive resistors PR1 and PR2, which are adapted to serve a well-known current-regulating purpose; a limit switch L which is provided with a main actuating coil L1 that is connected in series circuit with the propelling motors, and a second actuating coil L2 which is adapted to be excited from an auxiliary source of energy, under predetermined conditions, as hereinafter described; and an overload trip switch OT, the stationary and movable contact members of which are adapted to be connected in the controlling circuit of the line switch LS, in accordance with familiar practice.

Referring now to Fig. 2, the auxiliary control system shown, comprises a suitable auxiliary source of energy, such as a storage battery B, and a governing switch SW therefor; the actuating coils of the various motor-controlling switches that are illustrated in Fig. 1, together with suitable electrically interlocking contact members which are respectively associated with the various switches in accordance with well-known practice; a master controller MC which is adapted to occupy a plurality of motor-controlling positions $a$, $b$, and $c$, in both a forward and a reverse direction, for suitably supplying energy to the actuating coils of the various main circuit switches; and a plurality of train-line conductors TL for connecting the master controller MC to the sets of actuating coils, which may be disposed upon one or more mechanically coupled railway vehicles, as is customary practice.

The master controller MC, if moved to its initial operating position $a$ in the forward running direction, for example, will effect the automatic operation of the motors, starting as repulsion motors with the resistor AR in circuit, then short circuiting the resistor, then changing over to a "doubly-fed" connection with the resistor AR again in circuit and then excluding the resistor from circuit for the second time, each change of circuit connections being dependent upon the operation of the limit switch L, in accordance with familiar practice. If the master controller is moved to its second position $b$, an additional portion of the transformer winding S will be suitably automatically connected across the compensating field windings C1 and C2, thereby inductively increasing the voltage impressed upon the motor armatures; and, if the master controller is moved to its final running position $c$, the intermediate conductor of the "doubly-fed" connection is shifted to impress a lower voltage upon the compensating field windings, and, consequently, conductively impress a higher voltage upon the motor armatures.

It should be noted that, if the switches 10 and 11 are closed, while the switches 9 and 12 are opened, the motor current traverses the main field windings F1 and F2 in a predetermined direction relative to the current in the motor armatures; and if the converse is true, the current flows through the main field windings in the opposite direction, thereby providing a ready means for reversing the electrical relations of the field windings and armatures of the motors, when desired.

The closure of the reversing switches 10 and 11, which correspond to forward running of the vehicle, is accomplished by the establishment of a circuit from one side of the battery B through the switch SW, conductor 13, auxiliary contact segment 16 of the master controller, control finger 17, which engages the segment 16, conductor 18, interlocking contact member 9—out, the actuating coils of switches 10 and 11 and conductors 19 and 20, back to the opposite side of the battery B. In case it is desired to reverse the operation of the vehicle, switches 9 and 10 may be closed by the operation of the master controller in the opposite direction to any of its operative positions, whereupon a circuit is established from the conductor 13 through conductor 21, control finger 22, which engages a main contact segment 23 that corresponds to the reversed operation of the master controller and to which the contact segment 16 is electrically connected, conductor 24, main contact segment 25 of the master controller, which corresponds to forward operation thereof, an auxiliary segment 26 which is electrically connected to the main segment 25, control fingers 27 which engage the segment 26, conductor 28, interlocking contact member 10—out, the actuating coils of the switches 9 and 12, and conductors 29 and 20, to the opposite terminal of the battery B.

Assuming the master controller MC to be moved to its final running position $c$ in the direction indicated as "forward," the operation of the system may be described as follows: In both the "off" and all of the operative positions of the master controller MC, the line switch LS is closed by reason of the energization of its operating coil from the conductor 13 through conductor 13ª, interlock "Trolley-up," conductor 13ᵇ, the cooperating contact members of the overload trip OT and the actuating coil of the switch LS to the negative conductor 19.

An auxiliary control circuit is first established from the contact segment 25, through control finger 30, conductor 31, conductors 32 and 33 which are bridged by an interlock contact member 11—in, at which point the circuit divides, one branch thereof including conductors 33 and 34 and the actuating coil of the switch 1, and the other branch including conductor 35, interlock contact member 3—out and the actuating coil of the switch 8 to a junction point 36, whence circuit is completed through interlock 2—out and the negative conductor 29. Another circuit is thereupon established from conductor 35, through conductor 35ª, interlock 8—in and the auxiliary actuating coil L2 of the limit switch L. The main circuit connections are illustrated in Fig. 4.

As soon as the motor current has diminished to a predetermined value permitting the limit switch L to assume its lower position, a circuit is established from conductor 33 through conductor 33ª, interlock 8—in, conductor 37, interlock 1—in, the coöperating stationary and movable contact members 38 of the limit switch L, interlock 8—in, conductor 39, interlock 7—out and the actuating coil of the switch 7 to conductor 29. The accelerating resistor AR is thus short-circuited, as indicated by the dotted line in Fig. 4. As soon as the switch 7 is closed, its actuating coil circuit is transferred to interlock 7—in and through interlock 3—out to the conductor 35$^a$.

Upon the closure of the switch 7, a circuit is completed from conductor 39, through conductor 40, interlock 3—out, the actuating coil of the switch 3, interlock 4—out and the negative conductor 29. The switch 3 is thus closed to complete a "doubly-fed" connection of the propelling motors, an intermediate point of the transformer winding S being connected to a point intermediate the armatures A1 and A2 and the compensating field windings C1 and C2. The closure of the switch 3 causes the opening of switch 8 by reason of the inclusion of the interlock 3—out in its control circuit, and the circuit of the coil L2 of the limit switch is thereupon interrupted by reason of the exclusion of the interlock 8—in from its control circuit. Moreover, the switch 7 is momentarily opened by the exclusion of the interlock 3—out from its control circuit.

Figure 5:
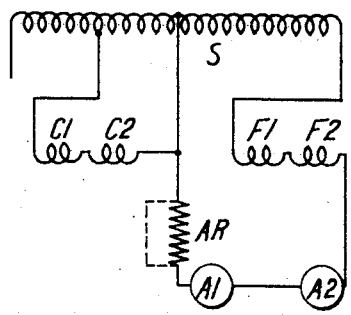

Upon the closure of switch 3, its actuating circuit is transferred to interlock 3—in and conductors 41 and 42 to the conductor 33$^a$. The main circuit connections at this time are illustrated in Fig. 5. Inasmuch as the auxiliary coil L2 of the limit switch was energized during the period of repulsion-motor operation, it will be appreciated that the limit switch L would not drop to its lower position, to complete connections for further accelerating the motors, until the motor current had decreased to a predetermined relatively low value; thus, the motors are relatively slowly started and accelerated to the point of "doubly-fed" connection, whereafter the coil L2 is rendered inoperative as just pointed out, and the acceleration of the motors proceeds at a more rapid rate. It should furthermore be noted that since the speed current characteristics of repulsion and doubly-fed motors are materially different, it is very desirable, in many instances, to provide a current-limit relay for accelerating the motor for which the value of current at which the relay operates may be changed automatically when the doubly-fed connection is established in order to provide a uniform acceleration.

When the limit switch L has again assumed its lower position, after the completion of the "doubly-fed" connection of the motor, a circuit is established from the contact members 38 thereof through interlock 3—in, and conductor 39 to the actuating coil of the switch 7, as hereinbefore described. The accelerating resistor AR is thereby again short-circuited, as indicated by the dotted line in Fig. 5, which corresponds to the position $a$ of the master controller.

Figure 6:
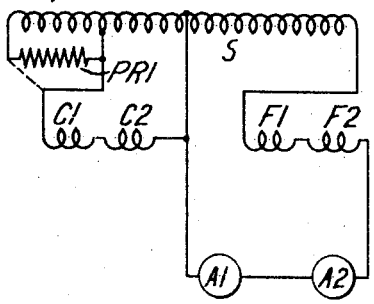
Figure 7:
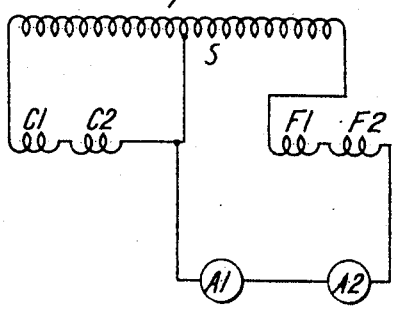

A circuit is next established from the main contact segment 25 of the master controller, through control finger 42$^a$, conductor 42$^b$, interlock 5—out, conductors 42$^c$ and 37, interlock 1—in, the coöperating contact members 38 of the limit switch in its lower position, conductor 43, interlocks 8—out and 7—in, respectively, conductor 44, interlock 2—out and the actuating coil of the switch 2 to the negative conductor 29. As soon as the switch 2 closes, its energizing circuit is transferred to interlock 2—in and conductor 45, which is connected to the conductor 42. The main circuit connections are illustrated in Fig. 6, the preventive resistor PR1 being connected across an additional portion of the transformer winding S temporarily. The switch 1 is then opened by reason of the exclusion from its controlling circuit of the interlock 2—out, and the switch 5 is closed by the completion of a circuit from conductor 42 through conductor 46, the actuating coil of the switch 5 and interlocks 1—out and 2—in, respectively, to the negative conductor 29. The preventive resistor PR1 is thus short-circuited, as indicated by the dotted lines in Fig. 6, and the simplified circuit connections are illustrated in Fig. 7, which corresponds to the position $b$ of the master controller.

Figure 8:
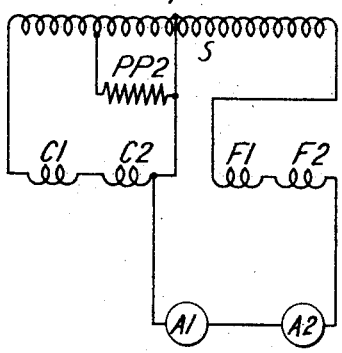
Figure 9:
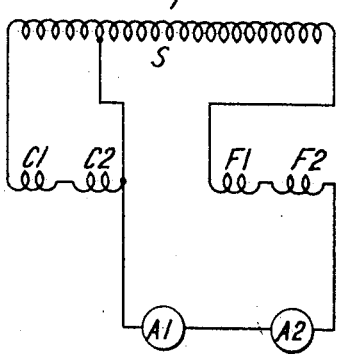

The switch 4 is next closed by the completion of a circuit from the main contact segment 25 of the master controller, through control finger 46$^a$, conductor 46$^b$, interlock 2—in, conductor 46$^c$, the coöperating contact members 38 of the limit switch L in its lower position, conductor 43, interlocks 8—out and 7—in, respectively, conductor 47, interlocks 5—in and 4—out, respectively, and the actuating coil of the switch 4 to the negative conductor 29. Upon the closure of the switch, its energizing circuit is transferred to interlock 4—in and conductor 48, which is connected to conductor 42. The preventive resistor PR2 is thus shunted across a predetermined intermediate portion of the transformer winding S, as shown in Fig. 8. The switch 3 is thereupon opened by reason of the exclusion from its controlling circuit of the interlock 4—out, and the switch 6 is next closed by the completion of a circuit from conductor 42, through conductor 49, interlock 3—out, the actuating coils of the switch 6, and interlock 4—in to the negative conductor 29. The final running connections of the propelling motors, corresponding to position $c$ of the master controller, are shown in Fig. 9.

It will be observed that the motors are initially connected as repulsion motors with the resistor AR temporarily in circuit and are relatively slowly accelerated to the point of "doubly-fed" connection, wherein the resistor AR is again temporarily included in circuit to be subsequently again short-circuited, the portion of the transformer winding S that is connected to the compensating field windings C1 and C2 being then increased, thereby inductively, or through transformer action, increasing the accelerating voltage impressed upon the armatures A1 and A2, and the portion of the transformer winding that is connected to the compensating field windings being then decreased, thereby conductively increasing the voltage impressed upon the motor armatures and effecting further acceleration.

Reference may now be had to Fig. 10, which discloses a main control system that differs from the system illustrated in Fig. 1 in that a reversing switch RS, of a familiar type, is associated with the main field windings F1 and F2 in place of the switches 9, 10, 11 and 12; and an additional switch 9′ is employed for connecting one terminal of the transformer winding S to the reversing switch.

The auxiliary control system illustrated in Fig. 11 comprises the battery B; the battery switch SW; the actuating coils for the various motor-controlling switches illustrated in Fig. 10; the train line conductors TL; and a master controller MC1 which is similar to the controller MC shown in Fig. 2 and which is adapted to assume a plurality of motor-controlling positions $a'$ to $c'$, inclusive, in both a forward and a reverse direction.

Assuming the reversing circuit connections to be as shown in the drawing, the combined action of the master controller and reversing switch may be described as follows: A circuit is established from one side of the battery B, through the switch SW, conductor 50, control finger 51, which engages main contact segment 52 of the master controller that corresponds to the reversed operation of the motors, conductor 53, main contact segment 54, which corresponds to the forward operation of the motors, auxiliary contact segment 55 which is connected to segment 54, control finger 56, conductor 57, coöperating stationary and movable contact members 58 of the reversing switch RS in its "forward" position, and the reversing coil R of the reversing switch, interlock 9′—out, and conductors 59 and 60 to the opposite terminal of the battery B. In case the reversing switch occupies its other operative position, the actuation thereof by the energization of the forward coil F to the position shown in the drawing, may be effected in a similar manner, and it is not deemed necessary to trace the circuits here.

Assuming that the master controller MC1 is moved in the forward running direction to its final position $c'$, the operation of the system illustrated may be set forth as follows:

The line switch LS is closed throughout both the off and all of the operative positions of the master controller, as previously described in connection with Fig. 2. A control circuit is also established from main contact segment 54 of the master controller through control finger 61, conductor 62, interlock 2—out and conductor 63 to a point where the circuit divides, one branch including the actuating coil of the switch 1 and the other branch including interlock 3—out and the actuating coil of the switch 8, to the common negative conductor 59. Another circuit is simultaneously established from auxiliary contact segment 64 which is connected to the main contact segment 52 of the master controller, through control finger 65, conductor 66, coöperating stationary and movable contact member 67 of the reversing switch in its forward position, conductors 68 and 69 and the actuating coil of the switch 9′, to the negative conductor 59. The main circuit connections at this time are illustrated in Fig. 13.

A circuit is thereupon established from conductor 62, through conductor 70, interlock 9—in, conductor 71, interlock 8—in, and the auxiliary coil L2 of the limit switch L, which coil is employed in a similar capacity to that set forth in connection with the system shown in Fig. 2; and a further circuit is completed from conductor 71, through conductor 72, interlocks 8—in, 1— in and 5—out, respectively, conductor 73, the coöperating stationary and movable contact members 74 of the limit switch L, provided it has dropped to its low-current position, conductor 75, interlock 7— out and the actuating coil of the switch 7 to the negative conductor 59. The closure of the switch 7 transfers its actuating coil circuit to interlock 7—in and conductor 76 which is connected to conductor 72. The resistor AR is thus short-circuited, as indicated by the dotted line in Fig. 13.

As soon as the switch 7 is closed, the switches 3, 2, 5 and 4 close progressively, being dependent upon the position of the limit switch L and upon the inclusion of certain interlocking contact members in their control circuits, in accordance with a familiar practice; for example, the switch 3 is closed, as soon as the switch 7 has assumed its closed position, by the completion of a circuit from conductor 75, interlock 7—in, conductor 77, interlocks 3—out and 4—out respectively, and the actuating coil of the switch 3 to the negative conductor 59. Upon the closure of switch 3, its actuating circuit is transferred to interlock 3—in and conductor 76, as was the case with the switch 7, and the switches 2, 5 and 4 are similarly connected as soon as they are closed. The switch 8 is opened, upon the closure of the switch 3, by reason of the exclusion from its control circuit of the interlock 3—out. The main circuit connections at this time are illustrated in Fig. 14, which corresponds to the position $a'$ of the master controller, and constitutes the initial "doubly-fed" connection of the propelling motors.

The switch 2 is next closed upon the completion of a circuit from the main contact segment 54 of the master controller, through control finger 76$^a$, conductor 76$^b$, interlocks 7—in and 5—out, respectively, conductor 73, coöperating contact members 74 of the limit switch, conductor 75, interlocks respectively associated with the switches 7, 3 and 2, and the actuating coil of the switch 2 to the conductor 59.

The progressive closure of the switch 2, as just outlined, connects the preventive resistor PR1 across an additional portion of the transformer winding S, and the opening of the switch 1 is thereby effected, by reason of the exclusion from its control circuit of the interlock 2—out, as described in connection with the system shown in Fig. 2 and as illustrated in Fig. 15. The switch 5 is also automatically closed as soon as the limit switch L drops to its lower position and an interlock 1—out has been included in the coil circuit of the switch 5. The preventive resistor PR1 is thus short-circuited, as indicated by the dotted line in Fig. 15, which corresponds to the position $b'$ of the master controller.

The switch 4 is then progressively closed, and the switch 3 is opened by reason of the exclusion from its control circuit of the interlock 4—out, whereby the preventive resistor PR2 is temporarily connected in the intermediate "doubly-fed" connection of the motors, as has been already described. The main-circuit connections at this time are shown in Fig. 16.

As soon as the limit switch L has again dropped to its lower position, a control circuit is established from the main contact segment 54 of the controller, control finger 77$^a$, conductor 77$^b$, interlock 5—in, conductor 73, coöperating contact members 74 of the limit switch, interlock 4—in, conductor 78, interlocks 6—out and 3—out, respectively, and the actuating coil of the switch 6, to the negative conductor 59. The closure of the switch 6 transfers its coil circuit to the conductor 76 as described in connection with the switch 7.

The preventive resistor PR2 is thus short circuited, as indicated by the dotted line of Fig. 16, which illustrates the final running connections of the propelling motors, and corresponds to the position $c'$ of the master controller.

The general operation of the motors during acceleration is similar to that described in connection with the system shown in Fig. 1, and no further description thereof is deemed to be necessary at this time.

I do not wish to be restricted to the specific arrangement or connections of circuits herein set forth, as modifications thereof may be made within the spirit and scope of my invention; and I, therefore, desire that only such limitations shall be imposed as are indicated in the appended claims.

I claim as my invention:

1. In a control system, the combination with a supply circuit, and a dynamo-electric machine adapted to be connected thereto, of an auxiliary source of energy, and a switch for effecting certain circuit connections of said machine, said switch being provided with a plurality of actuating coils respectively energized from the machine circuit throughout operation and from said auxiliary source during a predetermined starting period.

2. In a control system, the combination with an alternating-current supply circuit, and an electric motor of the commutator type adapted to be connected thereto, of an auxiliary source of energy, and a limit switch for effecting acceleration of the motor initially as a repulsion motor, said switch being provided with a plurality of actuating coils respectively connected in the machine circuit throughout operation and to said auxiliary source only during the period of repulsion-motor operation.

3. In a control system, the combination with an alternating-current supply circuit, and an electric motor of the commutator type, of a plurality of motor-controlling switches, an auxiliary source of energy, a plurality of actuating coils for said switches adapted to be energized from said auxiliary source, and a limit switch for progressively completing the actuating coil circuits of said switches to effect acceleration of the motor initially as a repulsion motor and subsequently as a "doubly-fed" motor, said limit switch being provided with a plurality of actuating coils respectively connected in the machine circuit throughout operation and to said auxiliary source only during the period of repulsion-motor operation.

4. In a control system, the combination with a supply circuit, and a dynamo-electric machine adapted to be connected thereto, of an auxiliary source of energy, a current relay for effecting certain connections of said machine, said relay being provided with an auxiliary coil adapted to be energized in varying degrees from said auxiliary source of energy dependent upon condition of connection of said motor.

5. In a control system, the combination with a supply circuit, and a dynamo-electric machine adapted to be connected thereto, of an auxiliary source of energy of substantially constant voltage, a current relay for effecting certain connections for said machine, said relay being provided with an auxiliary coil adapted to be connected to said auxiliary source of energy for certain of said motor connections.

In testimony whereof I have hereunto subscribed my name this 19th day of September, 1914.

HURD T. MORRIS.

Witnesses:
ARTHUR J. HALL,
B. B. HINES.